United States Patent [19]

Jacobson

[11] Patent Number: 4,521,267

[45] Date of Patent: Jun. 4, 1985

[54] COMPOSITE LABEL WEB AND METHOD OF LABELING

[75] Inventor: David N. Jacobson, Dayton, Ohio

[73] Assignee: Monarch Marking Systems, Inc., Dayton, Ohio

[21] Appl. No.: 622,927

[22] Filed: Jun. 21, 1984

[51] Int. Cl.$^{3}$ .................................................. B32B 7/06

[52] U.S. Cl. .................................... 156/249; 156/344; 156/DIG. 2; 156/DIG. 48; 428/40; 428/42; 428/43; 428/136; 428/194

[58] Field of Search .................................... 428/40–43, 428/136, 202, 906, 194; 40/2 R; 156/249, 344, DIG. 2, DIG. 48

[56] References Cited

U.S. PATENT DOCUMENTS

| | | | |
|---|---|---|---|
| 4,188,427 | 2/1980 | Grass | 428/41 |
| 4,280,863 | 7/1981 | Hamisch, Jr. et al. | 156/387 |
| 4,438,950 | 3/1984 | Hamisch | 283/70 |

*Primary Examiner*—Alexander S. Thomas

*Attorney, Agent, or Firm*—Joseph J. Grass

[57] ABSTRACT

There is disclosed a composite label web and method of labeling. The composite label web has a flexible, longitudinally extending carrier web with cuts to provide feed registration, flexible labels carried on the carrier web, non-tacky adhesive releasably adhering the labels at their undersides to the carrier web, a longitudinally extending line of weakening spaced between side edges of the labels and dividing the labels into detachably connected first and second label parts, pressure sensitive adhesive on the outer sides of the first label parts, and flexible masking material adhered to and masking off the pressure sensitive adhesive on the first label parts. The disclosed method can be practiced using a hand-held labeler which effects printing on the second label parts, effects separation of the labels from the carrier web at its delaminator and dispenses the labels. When the masking material is removed, the first label part can be adhered to the underside of a marginal side edge of a tag.

5 Claims, 5 Drawing Figures

FIG-1
FIG-4
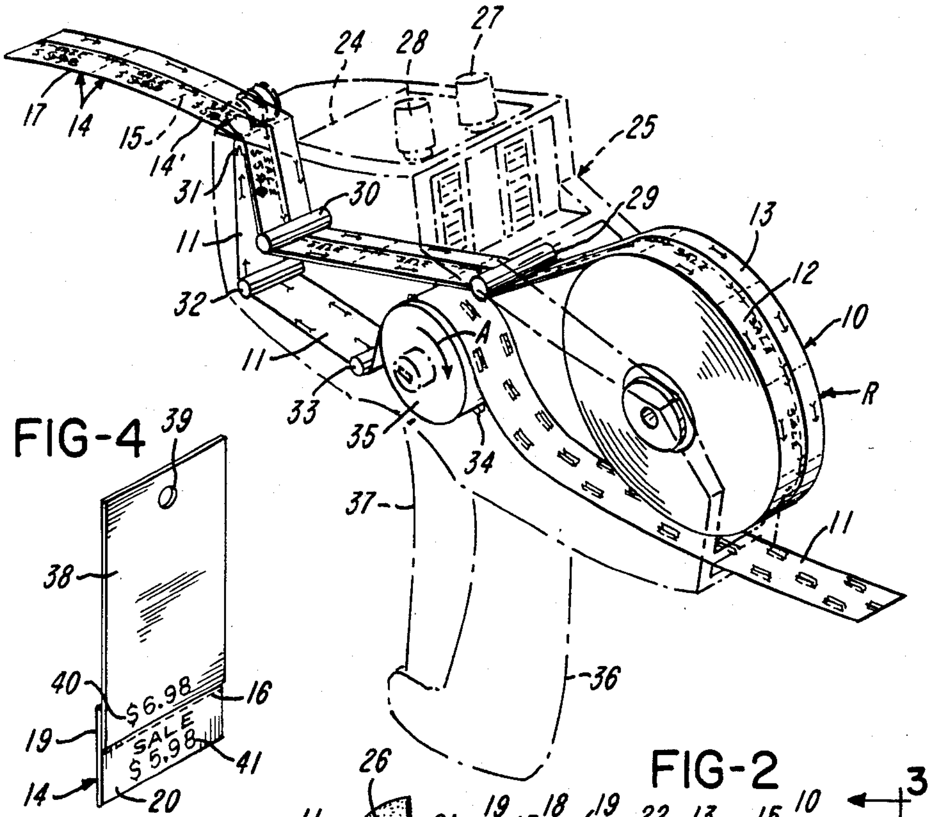
FIG-2
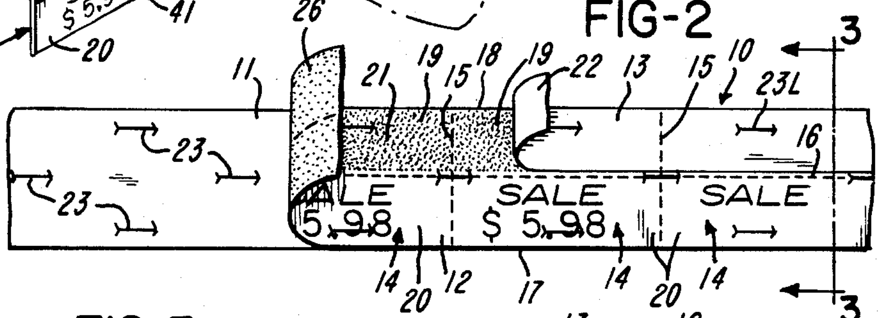
FIG-3
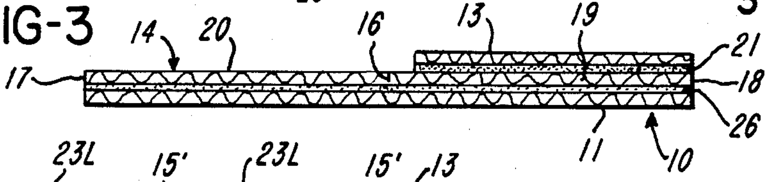
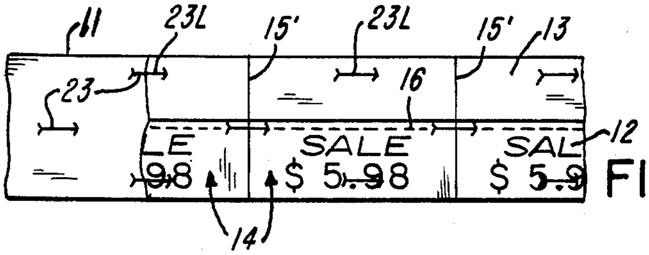
FIG-5

COMPOSITE LABEL WEB AND METHOD OF LABELING

BACKGROUND OF THE INVENTION

1. Field of the Invention

This invention relates to the art of composite label webs and method of labeling.

2. Brief Description of the Prior Art

The following U.S. Pat. Nos. are made of record: 4,188,427 to Joseph J. Grass granted Feb. 12, 1980 and 4,438,950 to Paul H. Hamisch, Jr. granted Mar. 27, 1984.

It is known to print two-part tags or labels using a table top printer in which the upper or outer surface of one part of the tag or label has a coating of pressure sensitive adhesive masked off by masking material. The masking material is releasably adhered to the pressure-sensitive adhesive. The upper or outer surface of the other part is free of adhesive, and pricing or other information is printed thereon by the table top printer. The underside of such two-part tags or labels are free of adhesive. Such two-part labels are used for re-pricing.

It is known to have labels releasably adhered by non-tacky or dry-tack adhesive to a carrier web.

SUMMARY OF THE INVENTION

The purpose of the invention is to provide an improved composite label web that can be printed and dispensed using a hand-held labeler. The composite label web is flexible and has labels with first and second detachably connected parts. The first parts have a coating of pressure-sensitive adhesive on their outer or upper surfaces. Masking material releasably adhered to the pressure sensitive adhesive covers the pressure-sensitive adhesive until the labels are printed and ready to be used. The labels are releasably adhered to a carrier web by a non-tacky or dry tack adhesive. The carrier web is provided with cuts, holes, notches or the like in predetermined relationship to the labels. The carrier web can be threaded through a hand-held labeler about a delaminator and thereafter to a toothed driver disposed downstream of the delaminator. When the labeler is operated, the second label parts of the labeler are printed and thereafter the printed label is brought to a dispensing position relative to the delaminator. Thereupon, the label can be removed manually, the masking material manually stripped away and the first label part adhered to a marginal side edge at the underside of a tag. The tag can, for example, be a price tag having a predetermined price. The second label part can be printed with a lower price and thus the second label part can be used for repricing for purposes of a sale. When the sale is over, the second label part can be torn away from the first label part and discarded. The non-tacky adhesive on the underside of the labels prevents the label from sticking to anything else, such as, other merchandise or the fingers.

BRIEF DESCRIPTION OF THE DRAWINGS

FIG. 1 is a perspective view of a hand-held labeler together with a composite web of labels in accordance with the invention;

FIG. 2 is a top plan view of the composite web;

FIG. 3 is a sectional view taken along line 3—3 of FIG. 2;

FIG. 4 is a perspective view showing how a label of the composite web is used in conjunction with a price tag; and FIG. 5 is a fragmentary view of an alternative embodiment of the invention.

DESCRIPTION OF THE PREFERRED EMBODIMENTS

With reference to FIGS. 1, 2 and 3 of the drawings, there is shown a flexible composite label web generally indicated at 10 which includes a longitudinally extending flexible carrier web 11, flexible label material 12, and flexible masking material 13. The label material 12 is separated into a series of labels or tags 14 by lines of weakening 15 in the label material 12 and the masking material 13, but the lines of weakness 15 preferably do not extend into the carrier web 11. A longitudinally extending line of weakening 16 is spaced between side edges 17 and 18 of the labels 12. The lines of weakening 15 and 16 can be made by perforation cuts but other known ways of weakening can be used. As shown, the line of weakening is approximately midway between the side edges 17 and 18. The line of weakening 16 divides the labels into first label parts 19 and second label parts 20. The first label parts 19 have a coating of pressure-sensitive adhesive 21 on their upper or outer surfaces. The masking material 13 has a release coating 22 on its underside. The masking material 13 masks off or covers the pressure-sensitive adhesive 21 until the label 14 is ready to be attached. The release coating 22 assures that the masking material is only lightly adhered to be pressure-sensitive adhesive 21 and can be easily manually stripped away.

The carrier web 11 has a pattern of feed cuts 23 in a predetermined relationship with respect to the labels 14 so that the labels 14 can be brought into registration with a print head 24 in a hand-held labeler 25. The feed cuts 23 extend through the carrier web 11 and the label material 12 as indicated at 23L. The upper surface carrier web 11 and the underside of the labels 14 are releasably adhered to each other by a suitable non-tacky or dry tack adhesive 26. This non-tacky adhesive is illustrated in FIG. 2 to be on the underside of the labels, but it releaseably adheres both the labels 14 and carrier web 11 together. As shown, the labels 14 are co-extensive in width with the carrier web 11. With reference to FIG. 1, the labeler 25 is shown loaded with a composite label web 10 in the form of a roll R. The labeler 25 can be of a construction such as the commercially available Monarch 1170 labeler disclosed in U.S. Pat. No. 4,280,863 to Paul H. Hamisch, Jr. et al granted July 28, 1981. The labeler 25 is shown to be capable of printing two lines of data, and hence there are two settable knobs 27 and 28. The composite label web 10 is drawn off the roll R and passes under a brake roll 29, about a guide roller 30, about a delaminator 31, about a guide roller 32, about a die roller 33 and into engagement with teeth 34 of a toothed driver 35. The teeth 34 enter the carrier web 11 at the feed cuts 23. The labeler 25 has a handle 36 to which a manually operable actuator 37 is pivotally mounted. Each actuation of the actuator 37 causes the print head 24 to move into and out of printing cooperation with the label 14 at the printing position to print price or other suitable data on the second label part 20. When used with this invention the knob 27 is used to set all the printing members to blank so that only the printing members related to the knob 28 will print to effect printing on the second label parts 20. During return of the print head 24 away from the label 14 at the printing position, the toothed driver 35 is advanced in the direction of arrow A to advance the carrier web 11 and advance a label 14' to a position in which only the trailing marginal edge of the label 14' is still adhered to the carrier web 11. A slight pull on the label 14' will cause it to be completely delaminated from the carrier web 11. Because the labels 14 are not completely severed from each other, the user can dispense a number of detachable labels 14 from the labeler. Thereupon, the user can remove the masking material 13 and manually apply them to the underside of a price tag such as is indicated at 38 in FIG. 4. The tag 38 can have a conventional attacher hole 39 by which the tag 38 can be attached to merchandise. The tag 38 is shown to be printed with price data 40, namely the illustrative "$6.98". The first label part 19 of the label 14 is shown to be adhered to the underside of the marginal edge of the tag 38 so that the second label part 20 projects beyond the tag 38 and shows any suitable notice such as "SALE" and price data 41, namely the illustrative "$5.98". In the event the merchandise has not been sold by the end of the sale, the second label part 20 can be torn from the first label part 19 along the line of weakening 16 and discarded.

The non-tacky adhesive which held the labels 14 to the carrier web 11 may still be adhered in part to the underside of the labels 14, but it cannot cause the labels to stick to anything becuase it is not tacky.

With respect to a second preferred embodiment of FIG. 5, this embodiment is the same as the first mentioned embodiment, and hence the same referenced characters are used, except that the labels 14 as well as the as the masking material 13 are completely severed along lines of complete severing 15' when extend completely across the labels 14 and the masking material 13.

Thus, only one label 14 at a time will project form the labeler 25 with its trailing marginal edge adhered to the carrier web 11.

Any suitable non-tacky or dry tack adhesive 26 can be used so long as the labels 14 are lightly adhered to and removable from the carrier web 11. An example would be an ethylene vinyl acetate type wax adhesive such as sold under du Pont trademark ELVAX or a heat activated nitrile type adhesive.

Other embodiments and modificiations of the invention will suggest themselves to those skilled in the art, and all such of these as come within the spirit of this invention are included within its scope as best defined by the appended claims.

I claim:

1. A flexible composite label web for use in a hand-held labeler having a delaminator comprising: a longitudinally extending carrier web, label material carried by the carrier web, cuts separating the label material into a series of labels, a non-tacky adhesive releasably adhering the labels at their undersides to the carrier web, the carrier web having means in a predetermined relationship to the cuts for registering the labels with respect to a label delaminator, a longitudinally extending line of weakening spaced from opposite side edges of the labels and separating the labels into detachably connected first and second label parts, pressure sensitive adhesive on the outer sides of the first label parts, the second label parts being free of adhesive and being adapted to have price data printed thereon, and masking material releasably adhered to a masking of the pressure-sensitive adhesive on the first label parts.

2. A composite label web as defined in claim 1, wherein the cuts are complete and extend across the entire width of the label material so that adjacent labels are completely severed from each other.

3. A composite web as defined in claim 1, wherein the cuts are partial so that adjacent labels remain detachably connected to each other.

4. Method of labeling using a hand-held labeler having a label delaminator, comprising the steps of: providing a flexible composite label web including a longitudinally extending carrier web, label material carried by the carrier web, cuts separating the label material into a series of labels, a non-tacky adhesive releasably adhering the labels at their undersides to the carrier web, the carrier web having means in a predetermined relationship to the cuts for registering the labels with respect to a label delaminator, a longitudinally extending line of weakening spaced from opposite side edges of the labels and separating the labels into detachably connected first and second label parts, pressure sensitive adhesive on the outer sides of the first label parts, the second label parts being free of adhesive and being adapted to have price data printed thereon, and masking material releasably adhered to a masking of the pressure-sensitive adhesive on the first label parts, providing a labeler having a label delaminator and a toothed driver disposed downstream of the delaminator, threading the carrier web through the labeler to guide the carrier web to the delaminator and thereafter a position in which the carrier web can engage the toothed driver, operating the labeler to dispense one or more labels, removing the masking material from a dispensed label, and attaching the first label part to the underside of a marginal edge of a tag so that the second label part with the price data projects beyond the tag.

5. Method as defined in claim 4, wherein the tag has price data, wherein the label is positioned so that the price data on the second label part is adjacent the price data on the tag, and wherein price data on the second label part is of a lower value than the price data on the tag.

* * * * *